United States Patent [19]

Linebarger

[11] Patent Number: 4,875,769
[45] Date of Patent: Oct. 24, 1989

[54] VELOCIMETER FOR A PRINTING PRESS WEB

[75] Inventor: Randolph S. Linebarger, Newbury Park, Calif.

[73] Assignee: Rockwell International Corporation, El Segundo, Calif.

[21] Appl. No.: 146,945

[22] Filed: Jan. 22, 1988

[51] Int. Cl.[4] .......................... G01P 3/36; G01N 21/86
[52] U.S. Cl. ........................................ 356/28; 250/559
[58] Field of Search ............................ 250/559; 356/28

[56] References Cited

U.S. PATENT DOCUMENTS

| | | |
|---|---|---|
| 3,838,924 | 10/1974 | Flower et al. . |
| 3,856,403 | 12/1974 | Maughmer et al. . |
| 4,148,587 | 4/1979 | Erdmann et al. . |
| 4,199,254 | 4/1980 | Kobayashi ........................... 356/28 |
| 4,255,048 | 3/1981 | Franke . |
| 4,311,383 | 1/1982 | Ohtsubo . |
| 4,350,443 | 9/1982 | Williamson . |
| 4,725,136 | 2/1988 | McCullough et al. ................ 356/28 |

OTHER PUBLICATIONS

G. Stavis, Instruments and Control Systems, Feb. 1966, pp. 99–102.

Ogiwara et al., Japanese Journal of Applied Physics, vol. 14 (1975), Supplement 14-1, pp. 307–310.

*Primary Examiner*—Stephen C. Buczinski
*Attorney, Agent, or Firm*—H. Fredrick Hamann; Craig O. Malin

[57] ABSTRACT

A velocimeter and a method for measuring the velocity of a printing press web are provided. The velocity is measured without contacting the web by measuring a speckle pattern which is reflected off the moving web by a laser. The reflected light is filtered and detected by a linear photodetector array which is differentially connected. The photodetector array output is fed into a differential amplifier to obtain a differenced output which has a frequency that is related to the velocity of the web. The difference output is filtered through a variable filter set at a predetermined bandpass center frequency and bandwidth, and its frequency is counted to obtain the approximate velocity of the web. Using the approximate velocity, a bandpass center frequency and bandwidth is selected which provides a substantially linear response of velocity at the counted frequency. The variable filter is reset to the selected bandpass center frequency and bandpass, and the frequency of its output is obtained. The web velocity is then determined using a predetermined relationship between web velocity and frequency for the selected filter setting.

8 Claims, 5 Drawing Sheets

VELOCIMETER FOR A PRINTING PRESS WEB

BACKGROUND OF THE INVENTION

This invention relates to the field of newspaper printing presses, and particularly to measuring the speed of a newspaper printing press web.

High volume, newspaper printing is a complex process requiring the correct selection, setting, and interacion of various materials and processes and the consideration of a host of physical and operational constraints. Modern printing equipment can produce newspapers at rates exceeding 70,000 copies per hour. Such printing equipment is capable of printing the pages, sectioning the pages an folding them in a continuous automatic stream.

The strem of newspapers begins as large rolls of paper. The rolls are unrolled to form continuous "webs" of paper which are fed through printing rollers and other equipment to print both sides of the web, combine it with other webs, and cut and fold the webs to form individual newspapers. The web moves at speeds up to 12.3 m/s (20 miles/hr), and the speed of all the units must be coordinated to avoid tearing the web and shutting down the entire process.

Tensioning rolls are provided to prevent web breakage while still providing sufficient tension to properly feed the paper through the various printing units. The speed of the drive rollers is also controlled to provide the proper speed at various stages along the web. However, to maintin optimum control over the entire process, it would be desirable to have a convenient, non-contact velocimeter to measure the speed of the web itself at various critical locations in the process. The use of velocimeters which contact the web with a roller is subject to error due to slipping between the roller and the web. Variation in web tension that may occur along its length can also cause problems when using contact velocimeters.

Non-contact velocimeters have been developed, but they have not been adopted for use with production line processes such as a printing press web. Such velocimeters include Doppler-effect devices such as radar, and speckle pattern devices such as described in U.S. Pat. Nos. 3,856,403 and 4,311,383. Experimental speckle pattern velocimeters are described by G. Stavis (Instruments and Control Systems, February, 1966, pgs. 99-102) and by H. Ogiwara and H. Ukita (Japanaese Journal of Applied Physics, Vol. 14 (1975), Supplement 14-1, pgs. 307-310). The velocimeters described in boh these articles were evaluated at speeds of less than 1 m/s. The Stavis device was tested by measuring the velocity of a wheel having a satin-finished nickel surface. The Ogiwara and Ukita device was tested by measuring the velocity of a lapped acrylic disk.

SUMMARY OF THE INVENTION

It is an object of the invention to provide a velocimeter to measure the speed of a newspaper web without contacting the web.

According to the invention, coherent light from a laser is reflected from a moving web of paper in a printing press. The reflected light is passed through a laser bandpass filter and onto a linear array of photodetectors. The photodetectors are positioned to detect the motion of the web using the speckle pattern which is produced when a coherent light is reflected from a moving surface. The photodetectors in the array are differentially connected so that they can detect the moving speckle pattern.

The two outputs from the photodetector array are amplified and fed into a differential amplifier which provides a single output that is the amplified difference between the two inputs. This differential amplifier also serves to line buffer the output to a 50-ohm impedance. This amplified differenced output may be further amplified, and is then passed through a variable filter. The variable filter is set at a bandpass center frequency and bandwidth which has been previously determined to be suitable for obtaining an approximate web velocity for the particular application. The frequency of the filtered output is measured with a frequency counter and the approximate velocity of the web determined from an empirically determined relationship between frequency and approximate web velocity.

To obtain a more accurate determination of web velocity, it is necessary to filter the amplified differenced output at a bandpass center frequency and bandwidth which have been empirically determined to provide a substantially linear relationship between the frequency of the differenced output and web velocity. Therefore, the approximate velocity is used to select a more optimum filter bandpass center frequency and bandwidth, and the variable filter is then reset at the appropriate frequency and bandwidth for the approximate velocity of the web. This can be accomplished by means of a computer which is programmed with predetermined relationships between web velocity, frequency of the differenced output, and bandpass center frequency and bandwidth. The computer is coupled to the frequency counter to obtain the frequency of the speckle pattern and to the variable filter to adjust it in response to the measured frequency. The computer also provides an output which displays the web velocity and can be used to control the process.

These and other objects and features of the invention will be apparent from the following detailed description taken with reference to the accompanying drawings.

DESCRIPTION OF THE PREFERRED EMBODIMENT

When coherent light is backscattered from a diffuse surface, a speckle pattern of small bright speckles is formed. When the diffuse surface moves, the individual bright speckles in the speckle pattern move. As is known in the prior art, the movement of the speckle pattern can be used to determine the velocity of the diffuse surface.

Figure 1:
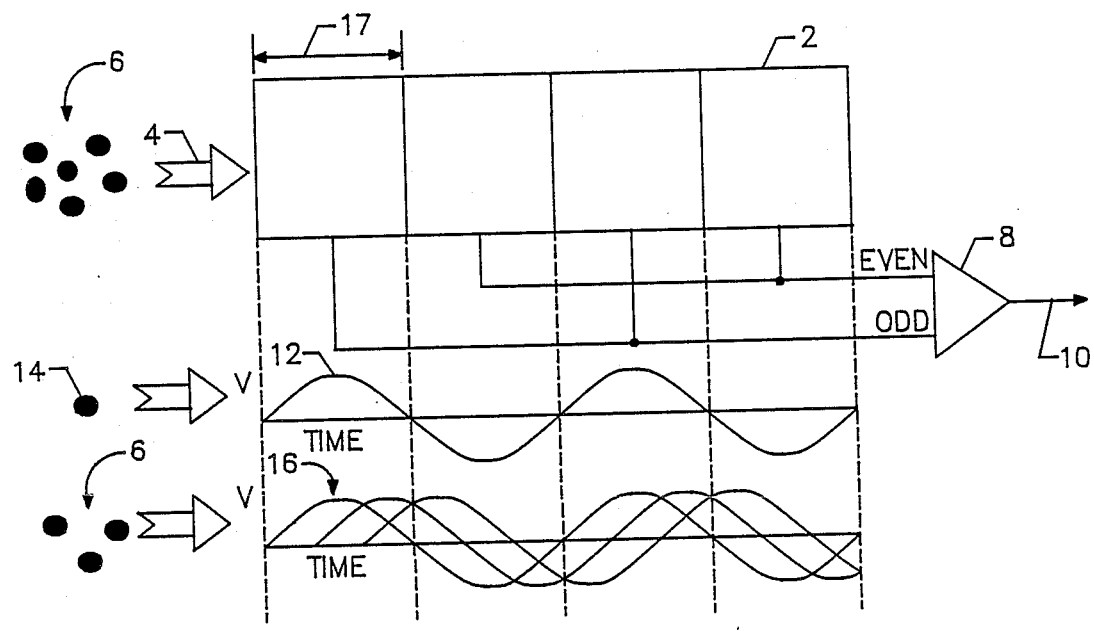
FIG. 1 illustrates the prior art principle of using a linear array and a speckle pattern to determine velocity.

FIG. 1 illustrates the use of a linear photodetector array 2 to measure the velocity of the surface. The array 2 is positioned in line with the motion 4 of a speckle pattern 6. The array is differentially connected, that is, the outputs of alternate detectors are summed by connecting them together as shown by the even and odd outputs in FIG. 1. These outputs are fed to a differential amplifier 8 which produces an output 10 that is the amplified difference between the even and odd outputs. The single sign wave 12 shows the voltage v, vs time signal which would be the ouput 10 as a single speckle 14 oves along linear array 2. A plurality 16 of such sine waves would form the signal for a speckle pattern 6. The center frequency of such frequency is related to the reciprocal of the detector spacing 17.

Figure 2:
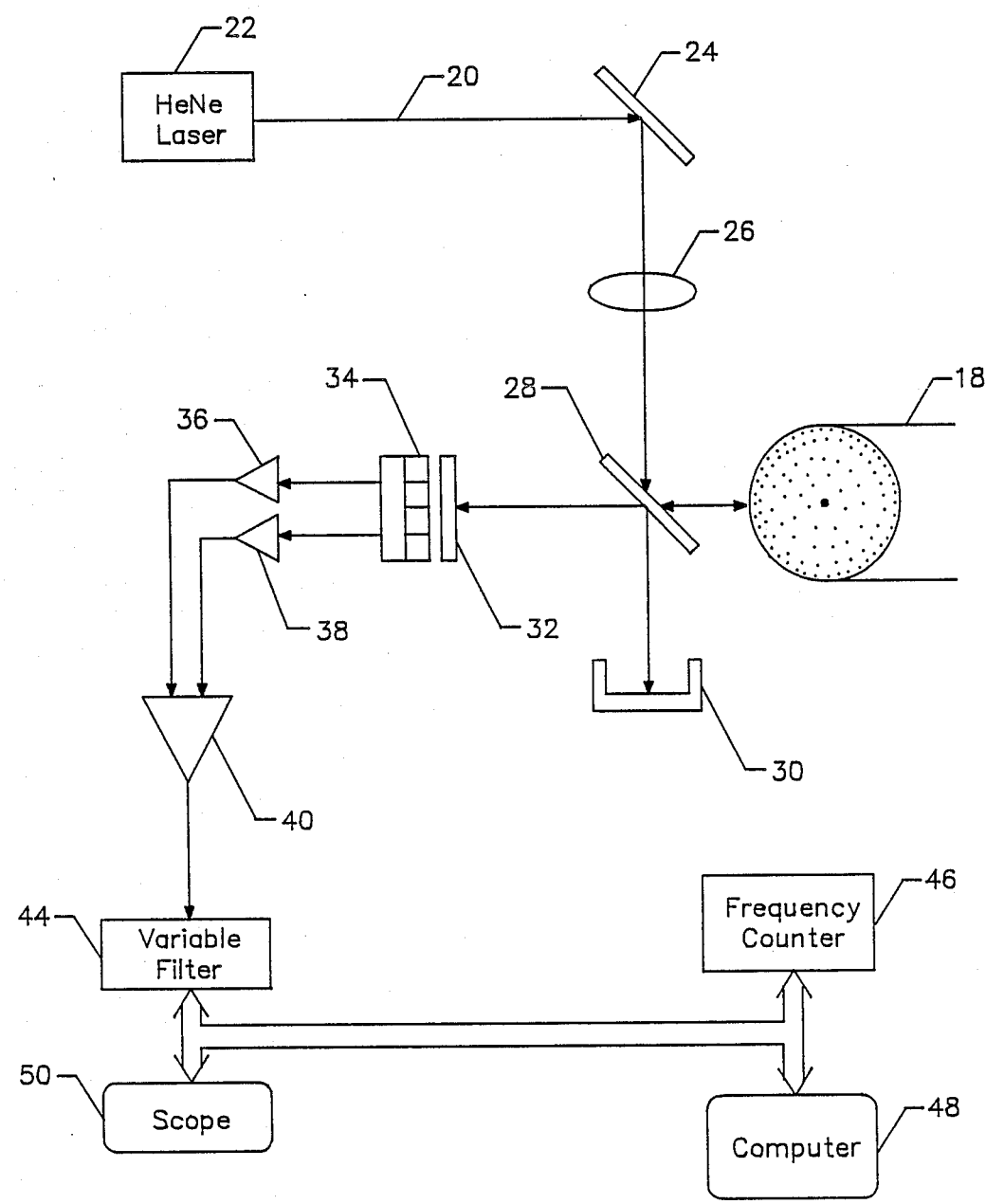
FIG. 2 is a schematic of the velocimeter according to the invention.

FIG. 2 is an apparatus which utilizes the principle illustrated in FIG. 1 to measure the velocity of a web 18 (a strip of paper) in a printing press. A beam 20 of coherent light from a laser 22 is reflected by mirror 24 through focusing lens 26 to 50% beamsplitter 28. Beamsplitter 28 reflects some of beam 20 onto web 18 and passes some of beam 20 onto beam dump 30. A portion of the beam which strikes web 18 is reflected back through beam splitter 28. This reflected light contains a speckle pattern produced by the diffusely scattering newsprint. It is filtered by laser line filter 32 and is then detected by linear photodetectoro array 34. For the helium-neon laser 22 shown in FIG. 2, a 6328 angstrom narrow bandpass fiter is used to reject all other incoming ambient light noise sources, although other laser sources and filters could be used. Photodetector array 34 is a 32-element Hamamatsu S 994-19linear photodetector array with a detector spacing (Ref. #17 in FIG. 1) of 0.6 mm.

Figure 3:
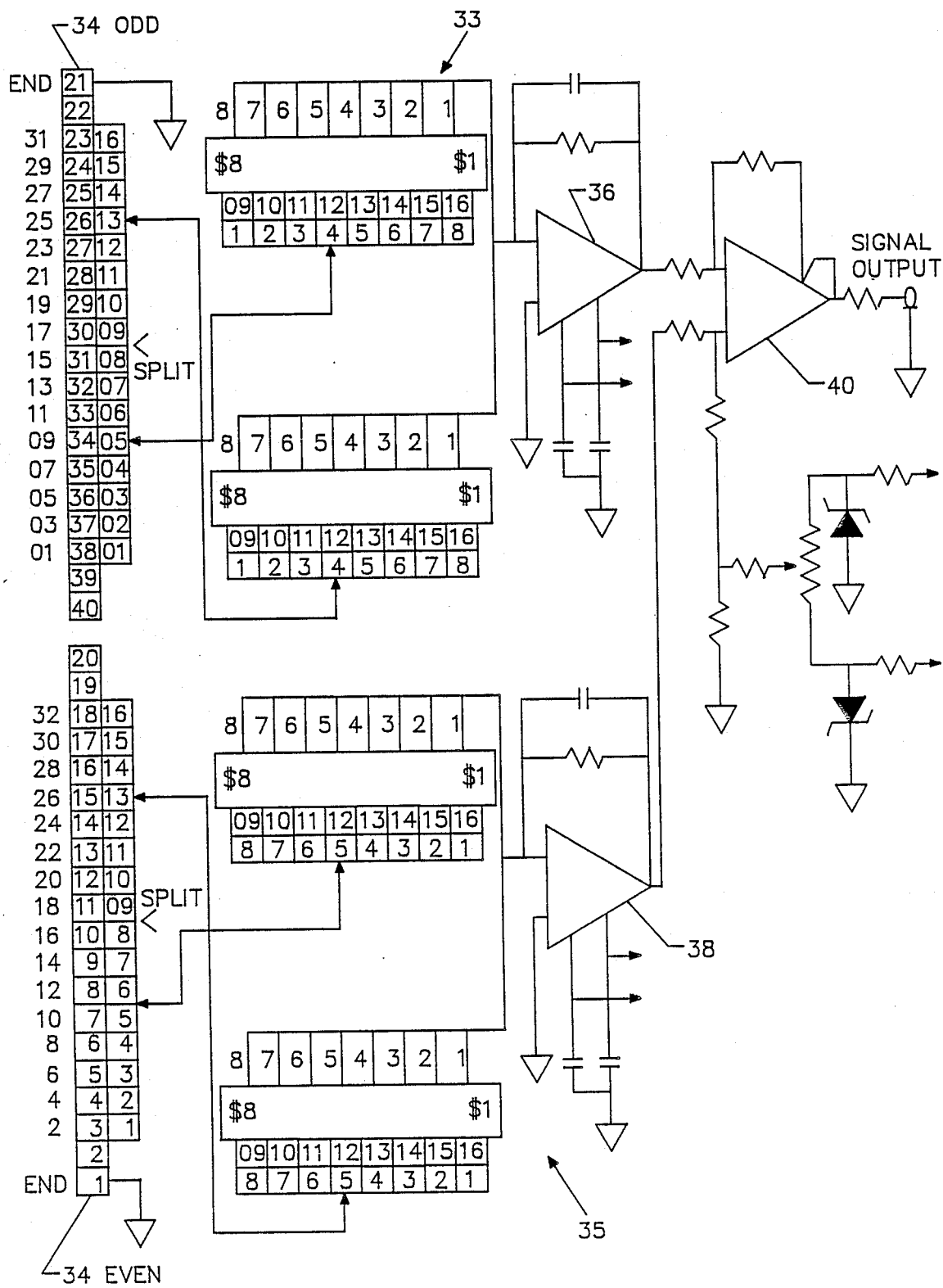
FIG. 3 is a circuit diagram of a photodetector array, photodetector electronics, and differential aamplifier.

As shown in greater detail by FIG. 3, the outputs of alternate detectors (#34 even and #34 odd) are summed and connected through matrix switches 33, 35 to separate low noise preamps 36, 38 (Burr-Brown OPA-102 BM). The two outputs are fed into differential amplifier 40 (a COMLINEAR CL 200A1) which also serves as a 50-ohm impedance line buffer.

The differenced output is then filtered by a variable filter 44 (a KROHN-HITE 3550R variable filter). The bandpass center frequency of this filter can be varied from 0.1 Hz to 1 MHz and its bandwidth can be varied from 0.1 Hz to 2 MHz.

Figure 4:
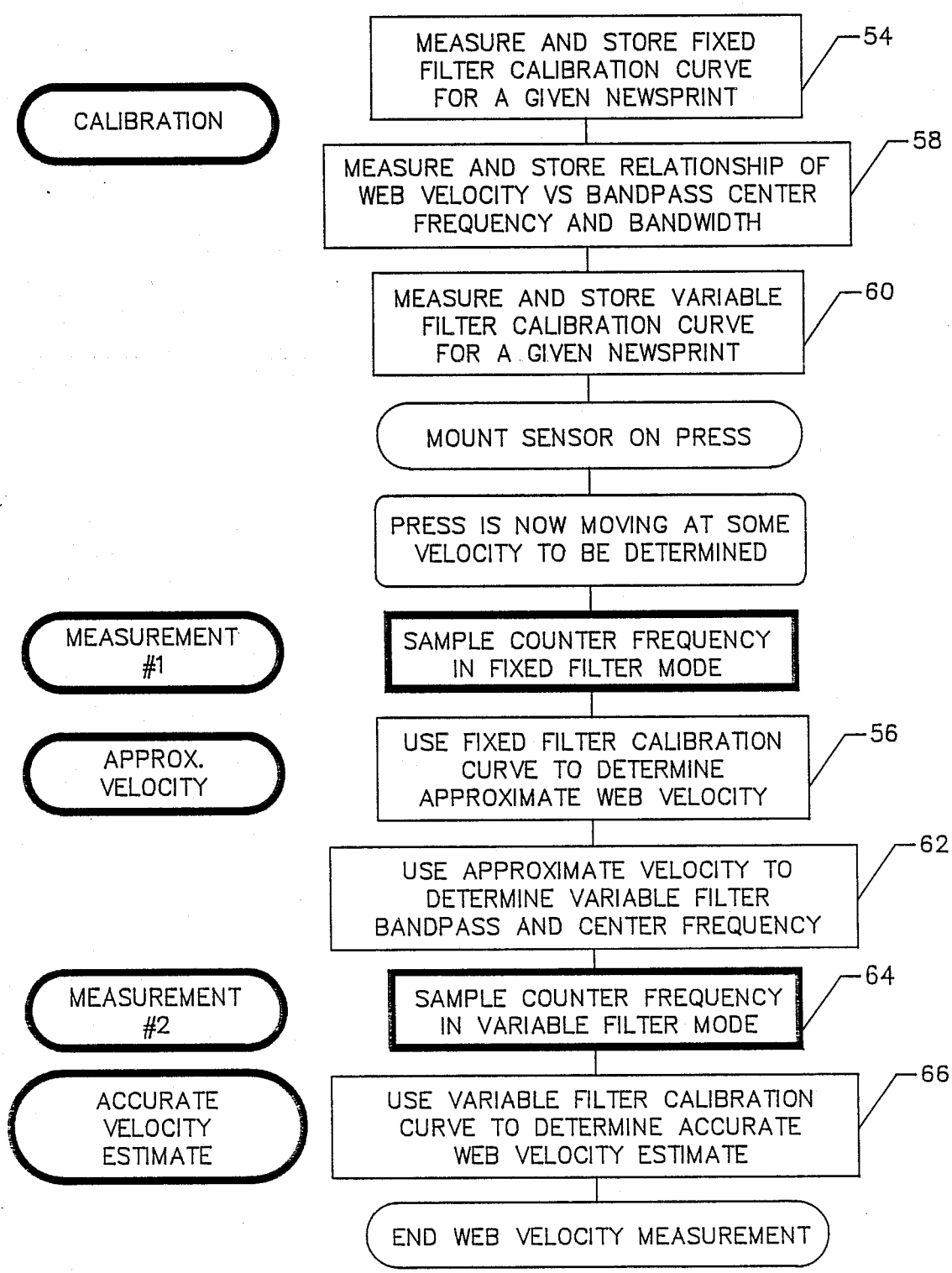
FIG. 4 is an algorithm showing the steps used to calibrate and measure web velocity.

The frequency of the filtered signal is then determine dby frequency counter 46 (an HP 6328A programmable frequency counter) which is connected to both the filter and to a computer (such as a Macintosh Plus computer) 48. The computer provides a means for controlling the bandpass center frequency and bandwidth of variable filter 44 in order to provide a substantially linear response of web velocity vs counter frequency. This is done based upon calibration curves which are used as shown by the algorithm in FIG. 4 and as described below in more detail with regard to the method of the invention.

The computer provides an output which can be used to display the actual web velocity, for example in oscilloscope 50.

The method of the invention uses the movement of the speckle pattern to determine the velocity of a newsprint web as described above with reference to FIG. 1. The velocity of the moving speckle pattern is proportional to the velocity of the moving newssprint, and is used to produce an electrical signal having a frequency which is also proportional to he web velocity. However, to provide an accurate indication of web velocity over a wide range of velocities such as used in modern printing presses (up to 12.3 m/sec), the signal obtained from the speckle pattern must be processed and filtered at bandpass center frequencies and bandwidths which are different at different web velocities, particularly in the high velocity regime.

A beam of coherent light is reflected from a moving newsprint web to obtain the speckle pattern. This reflected beam is filtered through a laser bandpass filter and then detected with a differentially connected linear photodetector as described above with reference to FIG. 2. The two outputs from the detector array are amplified, fed into a differential amplifier and buffered to obtain an amplified differenced output between the two outputs from the detector array. This differenced output is then filtered through a variable filter set at a predetermined bandpass frequency and bandwidth.

Figure 5:
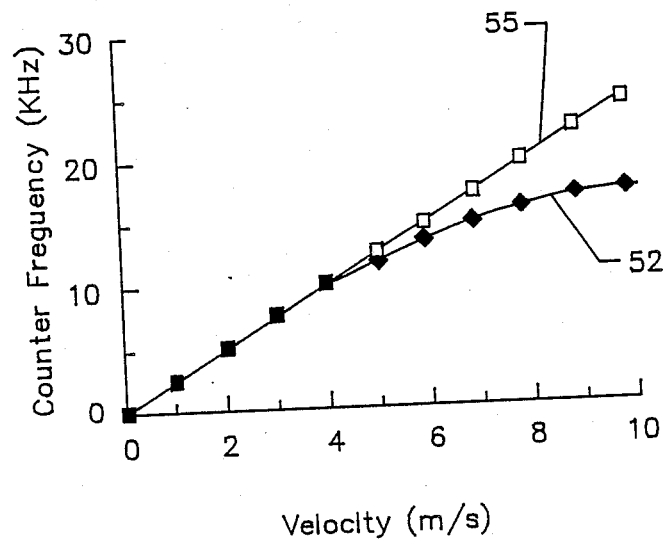
FIG. 5 are curves of web velocity vs counter frequency foro a signal which has been filtered at a constant predetermined bandpass and at a bandpass which has been adjusted to provide a linear relationship.

The predetermined filter setting is based upon empirical tests which are conducted for particular conditions such as type of newsprint paper and expected velocity to provide a curve of counter frequency vs web velocity. Such a curve for a predetermined fixed frequency is shown in curve #52 of FIG. 5. Typically, this curve tends to flatten at higher velocities and consequently the accuracy which can be obtained is decreased. However, the curve can be stored in a computer (step 54 in FIG. 4) and used to determine the approximate web velocity (step 56).

The frequency of the filtered differenced output is then measured using a frequency counter. This frequency is then used to obtain an approximate web velocity using the previously determined relationship between web velocity and counter frequency for the predetermined filter setting (step 56).

Figure 6:
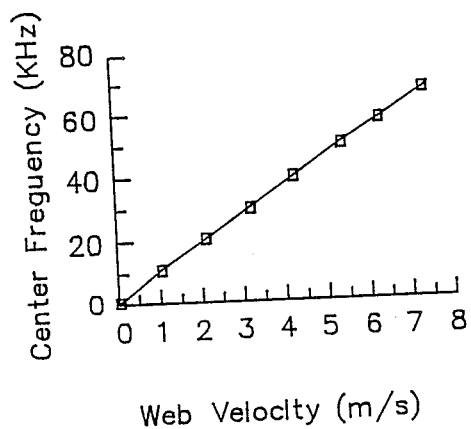
FIG. 6 is a curve illustrating the adjustment made in bandpass center frequency vs web velocity used to obtain a linear relationship between web velocity an counter frequency.

In order to obtain a more accuate reading of web velocity, the differenced output of the photodetector array is filtered at a bandpass center frequency and bandwidth which isi seleted for the particular web velocity being measured. This is accomplished empirically by predetermining the relationship between the web velocity and the bandpass center frequency (FIG. 6) required to obtain a substantially linear response at each counted frequency (curve 55 of FIG. 5). These relationships are stored in a computer (steps 58 and 60 in FIG. 4). The approximate velocity determined earlier is then used to select a more suitable bandpass center frequency and bandwidth (step 62) using the previously determined relationship (FIG. 6).

The variable filter is reset to the selected bandpass center frequency and bandwidth and the frequency of the differenced output is sampled after filtering at the reset value (ste 64). The variable filter calibration curve is then used to determine the web velocity (step 66).

Figure 7:
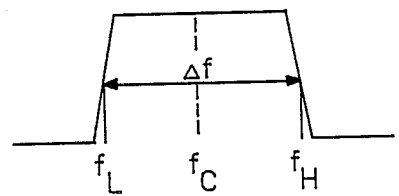
FIG. 7 illustrates the definition of fractional bandwidth.

FIG. 7 illustrates the definition of the terms related to bandpass characteristics of the variable filter. The bandwidth frequency delta f is the difference between the high frequency $f_H$ and the low frequency $f_L$ which are passed by the filter. The bandpass center frequency $f_c$ is the frequency midway between the high and low pass frequencies. Empirical tests are used for determining the optimum bandwidth at each frequency under actual operating conditions. For the velocimeter and conditions described above, a fractional bandwidth of 1.65 proved satisfactory.

Numermous variations can be made without departing from the invention. Accordingly, it should be understood that the form of the invention described above is illustrative and is not intended to liit the scope of the invention.

What is claimed is:

1. A velocimeter for a printing press web, comprising:
    a source of coherent light positioned to reflect light off a printing press web;
    a laser bandpass filter positioned to receive the light reflected off the web;
    a linear photodetector array positioned to detect web motion using a speckle pattern produced by the filtered light, the individual photodetectors being differentially connected;
    photodetector electronics for receiving the outputs of the photodetector array and for providing amplified and buffered outputs;
    a differential amplifier for receiving the outputs of the photodetector electronics and for providing an amplified differenced output;
    a variable filter which receives the amplified differenced output and provides a filtered output, the variable filter having a bandpass center frequency and bandwidth which can be varied;
    a frequency counter which receives the filtered output and provides an output which is related to the frequency of the filtered output; and
    means coupled to the variable filter and to the frequency counter for controlling the bandpass center frequency and bandwith to provide a substantially linear response of web velocity vs counter frequency.

2. The velocimeter as claimed in claim 1 wherein the linear photodetector array comprises a 32-element linear photodetector.

3. The velocimeter as claimed in claim 1 wherein the source of coherent light comprises a laser.

4. The velocimeter as claimed in claim 1 wherein the photodetector electronics comprises a low-noise preamplifier for each output from the photodetector array.

5. The velocimeter as claimed in claim 1 wherein the means for controlling comprises a computer programmed with predetermined relationships between web velocity, frequency of differenced output, and bandpass center frequency and bandwidth to obtain the substantially linear response.

6. A method of measuring the velocity of a printing press web comprising the steps of:
    reflecting a beam of coherent light from off a moving web;
    passing the reflected beam through a laser bandpass filter;
    detecting the reflected and filtered beam with a differentially-connected linear photodetector array which is oriented and positioned to detect web motion using a speckle pattern produced by the filtered light;
    obtaining an amplified differenced output between the outputs of the linear photodetector array;
    filtering the differenced output through a variable filter set at a predetermined bandpass center frequency and bandwidth;
    counting the frequency of the filtered differenced output;
    selecting a bandpass center frequency and bandwidth using predetermined relationships between web velocity, frequency of differenced output, and bandpass center frequency and bandwidth to obtain a substantially linear response at the counted frequency;
    resetting the variable filter to the selected bandpass center frequency and bandwidth;
    filtering the differenced output through the reset variable filter;
    counting the frequency of the differenced output from the rest variable filter; and
    determining the web velocity from the predetermined relationshp between web velocity and frequency for the selected bandpass frequency and bandwidth.

7. The method as claimed in claim 6, wherein the step of obtaining an amplified differenced output comprises:
    amplifying the outputs from the linear photodetector array;
    feeding the amplified outputs to a differential amplifier to obtain a differenced buffered output; and
    amplifying the differenced output.

8. The method as claimed in claim 6 wherein the step of selecting a bandpass center frequency and bandwidth comprises:
    a) determining a relationship between approximate web velocity and frequency of the differenced output obtained at different web velocities when filtered at the predetermined bandpass center frequency and bandwidth;
    b) determining bandpass center frequencies and bandwidths which provide a substantially linear response vs web velocity; and
    c) determining the approximate web velocity using the counted frequency obtained at the predetermined bandpass center frequency and bandwidth and the relationship determined in step "a";
    d) selecting a bandpass center frequency and bandwidth which provides the substantially linear response using the approximate web velocity obtained in step "c" and the relationship determined in step "b".

* * * * *